US008676451B2

(12) United States Patent
Brouwer et al.

(10) Patent No.: US 8,676,451 B2
(45) Date of Patent: Mar. 18, 2014

(54) METHOD AND APPARATUS FOR IN SITU TREATMENT OF GRASS

(75) Inventors: Gerardus J. Brouwer, Keswick (CA); Ralph Ratsep, Pefferlaw (CA)

(73) Assignee: Brouwer Sod Farms Ltd., Keswick, Ontario ( * ) Notice: Subject to any disclaimer, the term of this patent is extended or adjusted under 35 U.S.C. 154(b) by 361 days.

(21) Appl. No.: 12/899,068

(22) Filed: Oct. 6, 2010

(65) Prior Publication Data
US 2011/0100275 A1 May 5, 2011

Related U.S. Application Data

(60) Provisional application No. 61/249,174, filed on Oct. 6, 2009.

(51) Int. Cl.
*A01C 23/00* (2006.01)
(52) U.S. Cl.
USPC .............. 701/50; 239/147; 239/172; 111/121
(58) Field of Classification Search
USPC ......... 111/121, 118, 122, 157, 160–164, 167, 111/57, 54, 60; 172/4.5; 239/147, 172; 701/50, 1
See application file for complete search history.

(56) References Cited

U.S. PATENT DOCUMENTS

| 1,571,481 | A | * | 2/1926 | Kasmeier | 43/144 |
|---|---|---|---|---|---|
| 3,970,012 | A | * | 7/1976 | Jones, Sr. | 111/118 |
| 4,009,666 | A |   | 3/1977 | Russell et al. |   |
| 5,101,745 | A |   | 4/1992 | Podevels et al. |   |
| 5,119,744 | A |   | 6/1992 | Comer |   |
| 5,207,168 | A |   | 5/1993 | Comer |   |
| 6,505,568 | B1 |   | 1/2003 | Miers |   |
| 7,361,118 | B2 |   | 4/2008 | Ando et al. |   |
| 7,479,083 | B2 |   | 1/2009 | Schmidt et al. |   |
| 2008/0314301 | A1 | * | 12/2008 | Whalen et al. | 111/121 |

OTHER PUBLICATIONS

Trought, T.E.T. and Wood, A.L., The Control of Grass Grub in Pasture Using Liquid Insecticides Through Special Machinery, New Zealand Plant Protection Society (Inc.), 1970, pp. 141-150.
LIQUIJECT. Single-Pass Liquid Injection and Aeration Are Now a Reality. pp. 1-3. 2009.
Easy Acres. Core-Aeration, Why Does My Lawn Need It?, http://www.easyacreslawncare.com/Core-aeration.html. Sep. 10, 2009, pp. 1-2.
Kansas State University. Annual White Grubs in Turf. Home and Horticultural Pests. May 2004, pp. 1-4.

(Continued)

*Primary Examiner* — Christopher J Novosad
(74) *Attorney, Agent, or Firm* — Bereskin & Parr LLP/S.E.N.C.R.L., s.r.l.

(57) ABSTRACT

An apparatus for spraying a treatment liquid onto grass growing on a ground surface includes a plurality of rotatable discs spaced laterally apart across the path of travel. Each disc has a plurality of cutters which are adapted to penetrate the ground surface and to cut holes therein as the apparatus travels forwardly. The holes are spaced apart along the path of travel and are also spaced apart laterally. The apparatus also includes a set of nozzles positioned on the apparatus above the grass such that each nozzle is spaced rearwardly along the path of travel from its associated disc but is aligned along the path of travel with such disc. The nozzles are adapted to spray the treatment liquid. The apparatus also including a controller for causing the nozzles to spray the treatment liquid into the holes.

12 Claims, 8 Drawing Sheets

(56) References Cited

OTHER PUBLICATIONS

Stone Creek Tree Service. Core Aeration Q & A. http://stonecreektreeservice.com/qa.htm. Sep. 10, 2009, pp. 1-7.
Taylor, R.L. Control of Grass Grub. New Zealand Plant Protection Society (Inc.), 1970, pp. 159-162.
Hendrix and Dail Inc. Product Information: Turf Management Services. http://www.hendrixandail.com. Sep. 11, 2009, pp. 1-7.
McLean, J.R.F. tWO Techniques for Improving Broad-Cast Ground Application of Pesticides. New Zealand Plant Protection Society (Inc.), 1970, pp. 138-140.
Wikipedia (redirected from Spur Gear). Gear. http://www.en.wikipedia.org/wiki/Gear#Spur_gears. Sep. 7, 2009, pp. 1-27.
Turf Tamers. Programs and Services. http://www.turftamers.ca/services/. Sep. 10, 2009, pp. 1-2.
Green Turf Lawn Care P.E.I. Services. http:///www.greenturfpei.ca/services.php. Jun. 5, 2009, p. 1.
Golf and Turf. John Deere Aerators/RZI. http://www.cologofandturf.com/deere/aerarz1.htm. Jun. 5, 2009, pp. 1-2.
Cushman. Safety and Operation Manual: ENVIROJET, Liquid Injection System, Models 898564 and 898566. pp. 1-4.
New Zealand Plant Protection. Proceedings of the NZ Weed and Pest Control Conference 23 (1970). http://www.nzpps.org/journal/23/nzpp.php. Sep. 10, 2009, pp. 1-6.
Jurist. 355 F3D 1313 *Toro Company* V. *Deere & Company*. United States Court of Appeals, Federal Circuit. Jan. 20, 2004, pp. 1-12.
Toro. Workman 200 Gallon Sprayer. http://www.toro.com/grounds/spray/spray/vehicle/200.html. Jun. 3, 2009, p. 1-3.
Toro. Sports Field & Grounds. http://www.toro.com/grounds/index.html. Jun. 3, 2009, p. 1.

* cited by examiner

METHOD AND APPARATUS FOR IN SITU TREATMENT OF GRASS

CROSS-REFERENCE TO RELATED APPLICATIONS

This application claims priority to U.S. Provisional Patent Application No. 61/249,174, filed Oct. 6, 2009, the entirety of which is incorporated herein by reference.

FIELD

This invention relates to a method and apparatus for treating grass which is in a field, park, residential lawn or other suitable location for growing the grass, i.e. it is "in situ". More specifically, the invention relates to methods and apparatus for applying treatment materials to the grass to kill or otherwise destroy insects or other pests which may otherwise infest the growing grass and damage or kill it.

INTRODUCTION

Grass, such as turf grass is grown on sod farms and is used in lawns of homes, commercial and other buildings, as well as in parks, golf courses and in numerous other locations. Healthy turf grass is desirable both for its decorative effect and for its assumed environmental benefits. Unfortunately, turf grass attracts a number of insects and other pests (such as fungi) which infest or otherwise damage the turf grass and, in the case of insects, eat its roots or other parts of the grass plants, thereby damaging or killing the turf grass. Such insects exist wherever turf grass is to be found. Two well-known examples of such insects are grubs, which prefer to eat the roots of the turf grass and are usually found below the surface of the turf grass at about the level of the roots, and chinch bugs, which suck the liquid out of the stems of the grass plants and are often found at the surface of the turf grass.

Since many of the treatment materials which are effective to kill undesirable soil insects are toxic, the extent of their use has been limited and in many cases their use has been banned. Therefore, less effective treatment materials must usually be used. If the damaging insects to be removed are located at root level, below the surface of the turf grass, then in the past, the customary practice was that after treatment, the turf grass would be watered sufficiently so that the applied water would carry the treatment materials from the turf grass surface downwardly to the root zone, where it would be contacted by the soil insects in or near the root zone.

Unfortunately, this step of applying water to transport the applied treatment material from the surface down to the root zone usually requires a large volume of water. In many locations (e.g. in most fields where turf grass is grown for harvesting) sufficient water is usually not available. Even if adequate water were available (e.g. for parks, golf courses, home lawns), the cost of the large volume of water needed is often unaffordable. Turf grass growers therefore depend on rain, which is not always reliable.

Therefore, it would be desirable to have treatment apparatus and a method for treating the soil insects, in which the materials used can be delivered where needed, without using a large volume of water to carry the materials from the grass surface to a lower level, without causing harmful damage to the turf grass.

For simplicity, the treatment apparatus described will in the remainder of this description be referred to as a treatment machine (or simply a "machine").

U.S. Pat. No. 6,505,568 (Miers) discloses an applicator mechanism that is used in combination with a land vehicle and a source of fluid treatment substance to introduce the substance into a turf surface so that the turf surface is treated by the chemical. The applicator mechanism includes a frame mountable to the land vehicle. The frame is movable supported by gauge wheels and gauge rollers above the turf surface such as the frame is capable of being driven across the turf surface by the vehicle. At least one applicator unit is swivelably attached to and depends from the frame. The unit includes a sled slidably engaged in the turf surface and at least one coulter mounted axially rotatably to the sled and having a cutting edge that extends below the sled for engaging and cutting the turf surface. A chemical dispensing device is mounted to the sled rearwardly of the coulter and extends below the sled. The dispensing device is communicably interconnectable to the source of fluid treatment substance for introducing the substance into the turf surface cut by the coulter.

Each coulter forms a generally continuous slit in the turf, and the treatment substance is deposited into the soil, below the surface of the turf. The dispensing nozzle is positioned below grade, within the slit cut by the coulter.

U.S. Pat. No. 5,101,745 (Podevels et al.) teaches an apparatus and method for cultivating soil and turf by utilization of pressurized liquid injected into the soil and turf. A roller assembly is provided for applying mechanical pressure to the turf after cultivation. Further, a means for setting a first speed in a transport mode and a second speed in a cultivating mode is provided. The apparatus is designed to be bidirectional to allow the apparatus to be used in both a forward and reverse direction. The flow of the pressurized liquid is controlled to be at intervals of from about 0.010 to 0.065 seconds and at pressures from about 2,300 psi to about 5,500 psi through nozzles having diameters of from about 0.033 to about 0.090 inches. The apparatus utilizes a water hammer effect to effect the flow of pressurized liquid out of the nozzles and has found a relationship in the pressure and pounds per square inch of the cross-sectional area of the bore of the manifold to the accumulated area ports of the nozzles.

Podevels et al. teaches using the high-pressure liquid jets themselves to bore into the soil. Physical cutting devices are not used.

U.S. Pat. No. 4,009,666 (Russell et al.) discloses an apparatus for injecting a fluid below a soil or turf surface that includes a handle with a support rod attached thereto, and a plurality of nozzles carried by the support rod, each nozzle forming a stream of fluid passing therethrough. Each nozzle is provided with a skid having a curved surface for low friction contact with the soil or turf surface and for holding the nozzle out of contact with the surface. The apparatus is provided with a pump which cooperates with the nozzle to inject the fluid substantially below the surface.

Russell et al. teaches a device in which the liquid pressure is sufficient to inject the liquid below the surface of the ground. The device does not include any physical cutting means for opening a hole in the ground.

SUMMARY

In one embodiment, the invention provides an apparatus adapted for movement forwardly along a path of travel for spraying a treatment liquid onto turf grass which is in situ, for treating insects in said turf grass, said apparatus including a plurality of discs spaced laterally apart across said path of travel, each disc having a plurality of cutters thereon, said cutters being adapted to penetrate the turf grass and to cut holes therein as said apparatus travels forwardly and the tines contact the ground, said holes being spaced apart along said path of travel and also being spaced apart laterally, said apparatus further including a set of nozzles positioned on said apparatus such that each nozzle is spaced rearwardly along said path of travel from its associated disc but is aligned along said path of travel with such disc, said nozzles being adapted to spray said treatment liquid, said apparatus also including a controller for causing said treatment liquid to be sprayed continuously as said apparatus travels along said path of travel, thereby spraying said treatment liquid both into said holes and onto the surface of the turf grass between said holes.

In another embodiment the invention provides a method of applying a treatment liquid to turf grass in situ, to treat insects in said turf grass, said method including cutting lines of holes in said grass, said lines being spaced laterally apart and the holes of each line being spaced apart longitudinally, said method comprising spraying said treatment liquid continuously into the holes of said lines and onto the surface of the turf grass between such holes of a line.

According to one broad aspect of an apparatus to treat grass in situ, the apparatus is adapted for movement forwardly along a path of travel and for spraying a treatment liquid onto grass growing on a ground surface. The apparatus can include a plurality of rotatable discs spaced laterally apart across the path of travel. Each disc has a plurality of cutters thereon. The cutters are adapted to penetrate the ground surface and to cut holes therein as the apparatus travels forwardly and the cutters contact the ground surface. The holes are spaced apart along the path of travel and are also spaced apart laterally. The apparatus also includes a set of nozzles positioned on the apparatus above the grass such that each nozzle is spaced rearwardly along the path of travel from its associated disc but is aligned along the path of travel with such disc. The nozzles are adapted to spray the treatment liquid. The apparatus also includes a controller for causing the nozzles to spray the treatment liquid into the holes.

In some examples, the controller controls the nozzles to spray the treatment liquid continuously as the apparatus travels along the path of travel, thereby spraying the treatment liquid both into the holes and onto the surface of the grass between the holes.

In some examples, the controller is configured to control the nozzles to spray pulses of the treatment liquid into the holes and not to spray the treatment liquid onto a surface of the grass between the holes.

In some examples, the controller includes a timing mark carrier having a turn on timing mark and a turn off timing mark and a circuit for generating a turn on signal when its associated nozzle moves over a hole and for generating a turn off signal when the nozzle moves past the hole, so that the treatment liquid will be sprayed only in the holes and not between the holes.

In some examples, the plurality of discs are fixedly mounted to a rotatable shaft and the timing mark carrier comprises a timing disc also fixed to and rotatable with the shaft. The timing disc includes timing marks for each nozzle, the controller comprising a reader for detecting the timing marks and their position. The controller is coupled to the circuit to produce the turn on and turn off signals as the timing marks move past the reader.

In some examples, the plurality of cutters includes a plurality of tines. The tines rotate with the discs and cut the holes in the ground surface. Each tine has a leading edge that has a convex shape as viewed from the side. As the tine enters the ground surface, changes in a load of soil against the leading edge are reduced, thereby limiting damage to the grass as the holes are cut.

In some examples, each tine also has a trailing edge. The trailing edge is of convex configuration to push down the grass around the periphery of the holes thus helping to keep the holes unblocked.

According to a broad aspect of a method to treat grass in situ, a method of applying a treatment liquid to a grass growing on a ground surface includes the step of cutting a plurality of holes in the ground surface using a plurality of cutters. The holes are spaced laterally apart and being arranged in lines, wherein the holes of each line being spaced apart longitudinally. The method also includes a plurality of nozzles spraying the treatment liquid from above the grass into the holes.

In some examples, the method also includes moving the nozzles across the ground surface in the longitudinal direction and continuously spraying the treatment liquid into the holes of the lines and onto the grass between the holes of the lines.

In some examples, the method also includes spraying the treatment liquid into the holes but not onto the grass between the holes.

In some examples, the method also includes the step of controlling the spraying of the treatment liquid by providing a set of timing marks associated with the nozzles. The set of timing marks includes a plurality of alternating turn on and turn off marks. The method also includes the step of detecting the position of the timing marks with a controller. When one turn on mark reaches a predetermined position, the method also includes using the controller to generate a turn on signal and applying the turn on signal to the nozzles to start spraying the treatment liquid. When one turn off mark reaches the predetermined position, the method also includes using the controller to generate a turn off signal and applying the turn off signal to the nozzles to interrupt the spraying of the treatment liquid.

In some examples, the cutters are fixed to a shaft, the timing marks are located on a timing disc also fixed to the shaft, and the method also includes the step of rotating the shaft so that the turn on and turn off signals can be produced when the timing disc rotates with the shaft.

According to another broad aspect of an apparatus for treating grass growing on a ground surface, the apparatus includes a frame, that is configured to move along the grass in a first direction. The apparatus also includes a shaft rotatably connected to the frame. The shaft extends in a second direction that is generally orthogonal to the first direction. The apparatus also includes at least one disc mounted to the shaft and the shaft is configured to rotate the disc. The disc is moveable between a first position, where the disc is in rolling contact with the grass, and a second position where the disc is out of rolling contact with the grass. The apparatus also includes at least one cutter mounted to the periphery of the disc. When the disc is in the first position, the at least one cutter penetrates the ground surface to form at least one hole in the ground surface when the frame is moved in the first direction. The apparatus also includes a spray nozzle associated with the disc. The spray nozzle is supported by the frame above the grass and is positioned to direct a stream of treatment liquid into the at least one hole in the ground surface formed by the cutter. The spray nozzle is in fluid communication with a treatment liquid supply source.

In some examples, the at least one disc includes a plurality of discs. The discs are parallel to each other and spaced apart from each other in the second direction.

In some examples, the at least one cutter on the disc includes a plurality of cutters spaced apart around the periphery of the disc and the at least one hole formed in the ground surface by each disc comprises a plurality of holes spaced apart in the first direction.

In some examples, the spray nozzle includes a plurality of spray nozzles and each spray nozzle is associated with a corresponding disc. Each spray nozzle is operable to spray a continuous stream of treatment liquid when the apparatus is moved in the first direction so that treatment liquid is sprayed into each of the plurality of holes and onto the grass between the holes.

In some examples, the spray nozzle includes a plurality of spray nozzles, and each spray nozzle is associated with a corresponding disc. The apparatus also includes a controller operably connected to each spray nozzle to intermittently open and close each spray nozzle to spray pulses of treatment liquid into each of the plurality of holes in the ground surface and not onto the grass between holes.

In some examples, the plurality of cutters includes a plurality of tines connected around the periphery of each disc, each tine includes a tooth to form the hole.

In some examples, each tooth includes a leading edge and an opposing trailing edge extending between a root and an opposing tip. The leading edge has a convexly curved portion adjacent the tip to inhibit damaging the grass when the tooth forms the hole.

In some examples, the trailing edge has a generally convex portion forming at least 50% of the trailing edge to compress the grass around the periphery of the hole when the tooth exits the grass, thereby inhibiting the grass from entering the hole.

In some examples, the leading edge also includes a straight portion intermediate the convexly curved portion and the root.

In some examples, each tooth has a tooth height and a tooth width that is at least 65% of the tooth height.

In some examples, the at least one cutter is a blade extending continuously around the perimeter of the disc, and the at least one hole comprises a continuous furrow in the ground surface formed by the blade.

It is understood that features described in relation to one aspect above can also be used in combination with any of the other broad aspects, and that the features described above can be used in a variety of combinations and sub-combinations. It is also understood that the method described herein can be used in combination with any suitable apparatus, including those described herein.

DRAWINGS

DESCRIPTION OF VARIOUS EMBODIMENTS

Figure 1:
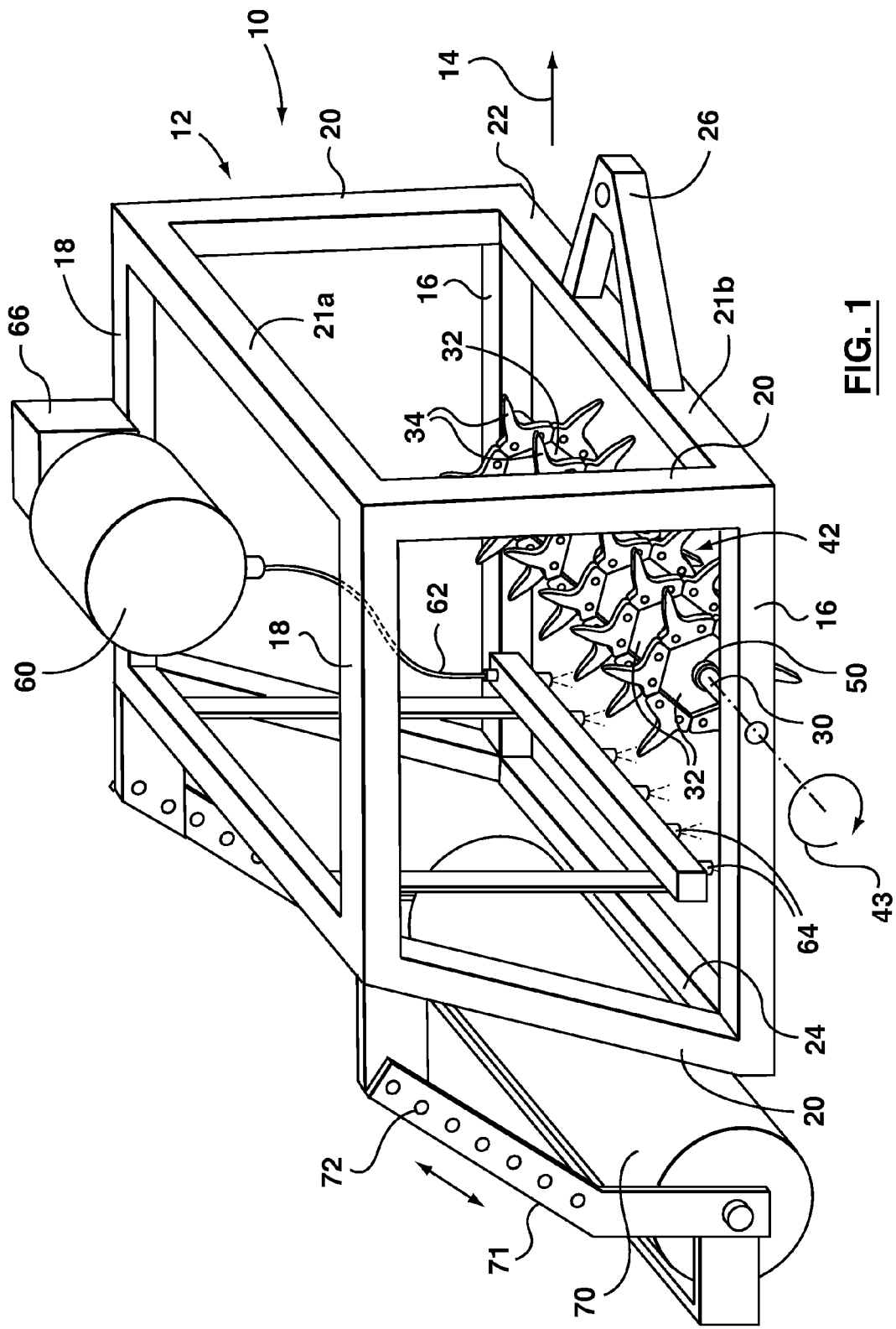
FIG. 1 is a perspective view of a portion of a machine for treating grass according to an embodiment the invention.
Figure 2:
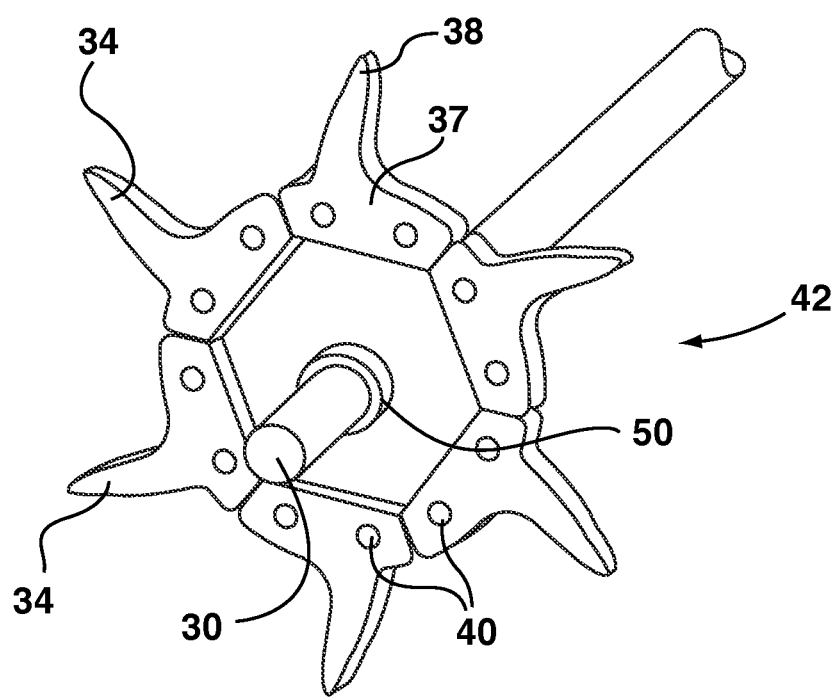
FIG. 2 is a perspective view of a portion of the FIG. 1 machine (namely a disc/tine set)

Reference is made to FIGS. 1 and 2, which show a treatment apparatus or machine 10 according to a first embodiment of the invention. The machine 10 includes a frame 12 adapted to move forwardly along a path of travel indicated by arrow 14. The frame 12 (which can have various forms) is shown as including two bottom side members 16, and two upper side members 18, all extending parallel to the path of travel 14. The side members 16, 18 are connected together by struts 20, and are also connected together by front and rear frame members 22, 24. (This forms upper and lower sub-frames 21a, 21b.) A towing bar 26 is connected to the front frame member 22 and extends forwardly for connection to a support and tow vehicle (not shown). This vehicle supports the front of the machine 10 and tows it forwardly along the path of travel.

The two lower frame side members 16 carry between them a rotatable shaft 30. The shaft 30 extends at right angles to the path of travel, is rotatably mounted on frame members 16 by bearings (not shown), and supports a series of laterally spaced discs 32. The discs 32 are fixed to the shaft 30 and rotate with it (as will be discussed). Each disc 32 includes a cutter for cutting through the surface of the grass and forming openings in the ground. The cutters are positioned around the periphery of the discs 32 to that they can contact the ground as the treatment machine 10 is moved across the grass.

One example of the cutter includes a number of tines 34 that are attached to each disc 32 and extend around the perimeter of each disc 32. (For greater clarity, only one tine is shown on several of the discs 32 in FIG. 1.)

Each tine 34 has a base 37 and a tooth 38 extending from the base. The base 37 of each tine 34 is attached to its supporting disc by two bolts inserted through pre-formed bolt holes 40. The tines 34 and their supporting disk 32 will be referred to hereinafter as a "disc/tine set". There are preferably five or six laterally spaced disc/tine sets on the shaft 30, but those skilled in the art will appreciate that any other suitable number of sets may be used.

Figure 3:
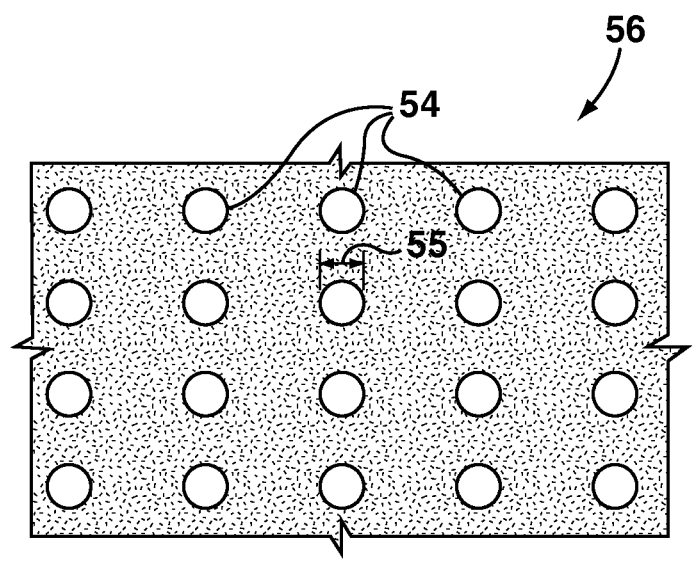
FIG. 3 is a top view showing one pattern of holes that may be formed by the machine of FIG. 1.

Each disc/tine set 42 is preferably fixedly mounted on the shaft 30 by an appropriate mounting 50. Therefore, when the machine 10 is towed along the path of travel, and if the disc/tine sets 42 are in a lowered position in which the tines 34 contact or penetrate the ground, then all of the disc/tine sets 42 on shaft 30 will rotate in unison due to the movement of the machine 10 and will cut spaced holes in the turf grass over which the machine 10 is being towed. For example, if machine 10 moves from left to right as shown in FIG. 1, then the disc/tine sets 42 will rotate clockwise as shown by arrow 43 in FIG. 1. FIG. 3 shows exemplary holes 54 which have been cut in ground through the turf grass 56 by the disc/tine sets 42. The holes 54 form a square pattern 56.

As indicated in FIG. 1, the machine 10 may carry a large tank 60. Tank 60 can be filled with the treatment liquid to be applied to the grass. The treatment liquid is usually a mixture of water and one or more suitable chemicals to treat grass, such as turf grass. The treatment liquid may be any liquid suitable for controlling, reducing, or eliminating pests. For example, the treatment liquid can be a pesticide, an insecticide, a fungicide or can contain biological treatment agents, such as nematodes (for example beneficial or predatory nematodes), depending on the type of pest. Alternatively, or in addition, the treatment liquid can include fertilizers, nutrients or other growth enhancing compounds. A hose 62 leads from the tank 60 to a series of nozzles 64, one located behind each disc/tine set 42. The nozzles 64 are preferably adjusted to spray the treatment liquid downwardly onto the ground beneath the machine in laterally spaced lines, as will be discussed. The nozzles 64 can be any suitable type of fixture or opening that allows a stream of liquid to be released and to be directed toward the holes in the ground. Examples of such fixtures include, for example, orifices or apertures in headers or pipes, the end of a hose or pipe (optionally flexible), spigots, valves and any combination or sub-combination thereof.

In one embodiment, the tank 60 is pressurized by pump 66, shown diagrammatically in FIG. 1. Pump 66 may include an electric or hydraulic motor and a pressure regulator (not separately shown). This equipment can alternatively be carried on the towing vehicle, but is preferably placed on the machine 10 to ensure that the machine 10 is heavy enough so that the tines 34 will penetrate the ground. The pump and pressure regulator are connected to the tank 60 via another hose or other suitable means (not shown). If desired, the pump 66 can be driven from the power take-off of the towing vehicle.

It is usually desirable that the holes 54 which have been cut by the machine 10 be about 0.75 inches to 3 inches deep. Preferably, the machine operator will usually cut a few holes in the turf grass (by hand or by using the machine 10) to determine the depth at which the insects are located. The operator then sets the depth of the holes to be cut in the turf grass to about the depth at which the insects are located. To support the machine 10 and to control the hole depth, a ground roller 70 may be provided, supported just behind the frame 12 by two roller side supports 71. Rolling over the holes 54 with the ground roller 70 can help close the holes formed by the machine 10 after the treatment liquid has been deposited into the holes 54. Closing the holes may help repair some of the cosmetic damage of the grass, and may help shelter treatment liquid in the holes from sunlight (including ultraviolet rays). Sheltering the treatment liquid from UV rays can be beneficial when the treatment liquid contains compounds that degrade when exposed to UV light. Re-closing the holes 54 may also help reduce evaporation of the treatment liquid contained in the holes 54. Optionally, instead of a single continuous member as illustrated, the ground roller 70 can include a plurality of smaller rollers or wheels (not shown) arranged in pairs that are positioned behind each cutter. Such roller pairs can be closely spaced to each other, and are positioned on opposite sides of the corresponding cutter (for example the disc) so that the rollers will roll over the side edges of the holes 54 to help close the holes 54, while not rolling over the grass located between the lines of holes 54.

The ground roller 70 can be moved upwardly or downwardly relative to the frame 12 by lifting the entire rear portion of the machine 10, using the hydraulic lift (not shown) of the machine 10, which is used when the machine 10 is to be transported, or any other suitable lifting device. When the rear portion is lifted, the ground roller 70 can be set at any desired height by inserting bolts (not shown) through holes 72 in the side supports 71 for the ground roller. This permits the disc/tine sets 42 to be lowered into a position in which the teeth 38 of the tines penetrate into the ground to the desired distance. Therefore, as the machine 10 travels forwardly, the holes 54 (FIG. 3) will be cut in the turf grass. Optionally, instead of, or in addition to the ground roller 70, the machine 10 can be supported by one or more wheels (not shown) that can roll over the turf grass surface. Optionally, the hole depth can also be adjusted by using cutters with a suitable profile, as described in detail below.

Figure 4:
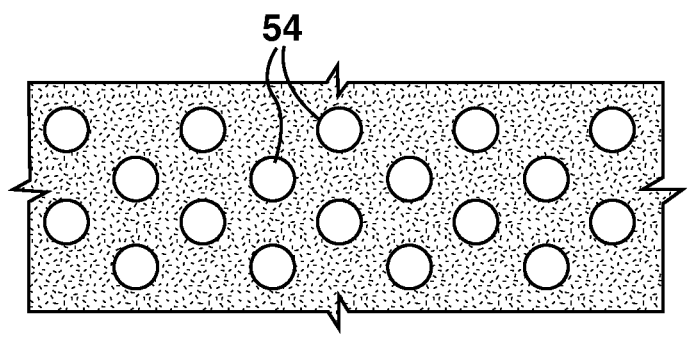
FIG. 4 is a top view of a second pattern of holes formed by the machine of FIG. 1.
Figure 5:
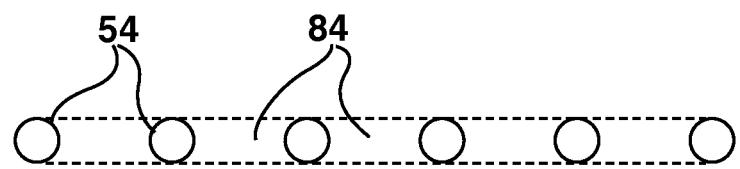
FIG. 5 is a perspective view of two holes and the turf grass surface between them, as formed by the FIG. 1 machine.

Referring now to FIGS. 3-5, the dimensions of the holes and their spacing will depend on the application. For many applications, e.g. white grubs, the depth is set by the machine operator as discussed above. The "diameter" 55 of the holes 54 (as measured along the path of travel) will typically be between about 0.5 inch and 1 inch. It is understood that while the holes 54 are illustrated as being generally circular with a constant diameter 55, the holes 54 can be any suitable shape (including rectangular, oval and square) based on the shape of the cutters used. It is also understood that the holes 54 may have different sizes in the direction of travel and the transverse direction.

The spacing of adjacent holes 54 (also as measured along the path of travel) can be between two and ten inches, and is preferably between about three to six inches. Since the holes 54 are formed by the tips of the tines, the holes 54 usually have an elongated rounded overall appearance but with corners of a relatively square appearance.

The lateral spacing of the holes 54 (i.e. their spacing along the second direction defined by the shaft 30) may also be about the same distance (between three and six inches). All these dimensions can change depending on the application.

As discussed, when the machine 10 is towed along the path of travel 14, and if the disc/tine sets 42 are lowered into contact with the ground, then the disc/tine sets 42 will rotate and cut holes in the ground. The distance between the tips of adjacent tines 34 on a disc 32 can be adjusted as desired, by controlling the size and spacing of the tines when they are made. As stated, the distance between the tips of adjacent tines mounted on a disc will typically be about three to six inches, but any other suitable distance may be used depending on application. The number of tines mounted on a disc can also be varied, but typically about seven tines will be mounted on and will extend around the perimeter of each disc, with their lateral spacing usually being about five to ten inches. Alternatively, each disc with its own tines can be made integrally as one single unit.

The width of each hole will depend on the thickness of the tines 34. If the holes are too large, particularly in their width (i.e. their lateral dimension), then the turf grass may be damaged in its appearance and may also be too densely compacted by tines. This problem can be avoided by using "core" type cutting machines to extract the soil that was located in the hole. However, such machines are costly and need frequent maintenance. When solid tines as shown are used, the width of the holes will usually not exceed about one inch and may be about 0.5 inches.

If desired, and as shown in FIG. 4, the lines of holes 54 can be offset from each other by half the length of the spacing between holes measured along the path of travel, so that the holes form a sloping pattern as shown in FIG. 4, or the holes can be arranged in other patterns, as desired. The hole pattern used may be chosen to improve the aeration of the turf.

The machine 10 can be used to perform several different treatment methods. In one embodiment of the invention, the treatment liquid to be applied to the turf grass is pumped continuously through the nozzles 64 as the machine 10 travels forwardly along the path of travel. The nozzles 64 are preferably shaped so that each emits a straight stream of treatment liquid, i.e. the stream from each nozzle does not fan outwardly after it leaves the nozzle. The diameter of the stream emitted from each of the nozzles 64 is preferably (but not necessarily) made slightly narrower than the width of the holes 54, so that when a hole 54 moves underneath a nozzle 64, the entire discharge stream from the nozzle is deposited in the hole 54 while the nozzle is fully over the hole, and none of the discharge is deposited beside the hole 54. However, since the spraying can be continuous as the machine 10 moves, the treatment liquid can also be applied to the turf grass surface between the holes, as indicated by area 84 in FIG. 5.

The tips of the nozzles 64 are preferably positioned at a relatively short distance above the surface of the turf grass (typically about two to six inches). The short distance between the nozzle tips and the turf grass helps to ensure that the treatment liquid emitted from the nozzles will be delivered where desired. In addition, if there are any leaves, blades of grass or other debris covering a hole 54 and which tend to obstruct the flow of treatment liquid into a hole 54, the proximity of the nozzle 64 to the hole 54 will permit the jet of treatment liquid more easily to blow away the obstructing material. The pressure of the treatment liquid should be made sufficient to penetrate any such loose debris. A pressure of between 60 and 300 psi has been found suitable in many applications, but any other suitable pressure may be used.

Providing treatment liquid both on the surface (thatch layer) and below the surface of the turf grass enables the treatment liquid to contact insects or grubs within the thatch layer and insects burrowed under the soil. Treatment liquid delivered as described above will usually be effective to treat insects at root level (e.g. grubs), and insects at the surface of the turf grass (e.g. chinch bugs). Because the treatment liquid is deposited both into the holes 54 and onto the turf grass surface between the holes 54 at relatively high pressure, the liquid reaches most of the soil insects present and provides reasonably effective treatment.

A problem which has been common with machines for treating turf grass in situ which include the step of cutting holes in the turf grass, is that such machines may tend to damage the appearance of the turf grass, at least temporarily (until the damaged grass can grow and heal itself). To help reduce such damage to the turf grass, the machine 10 can optionally be provided with a plurality of teeth having a tooth profile selected to reduce turf damage caused by each tooth entering and exiting the turf grass. Examples of such a special profile for the teeth, that can be formed on the tines 34 in order to reduce cosmetic damage to the turf grass, are explained in detail below.

Figure 6:
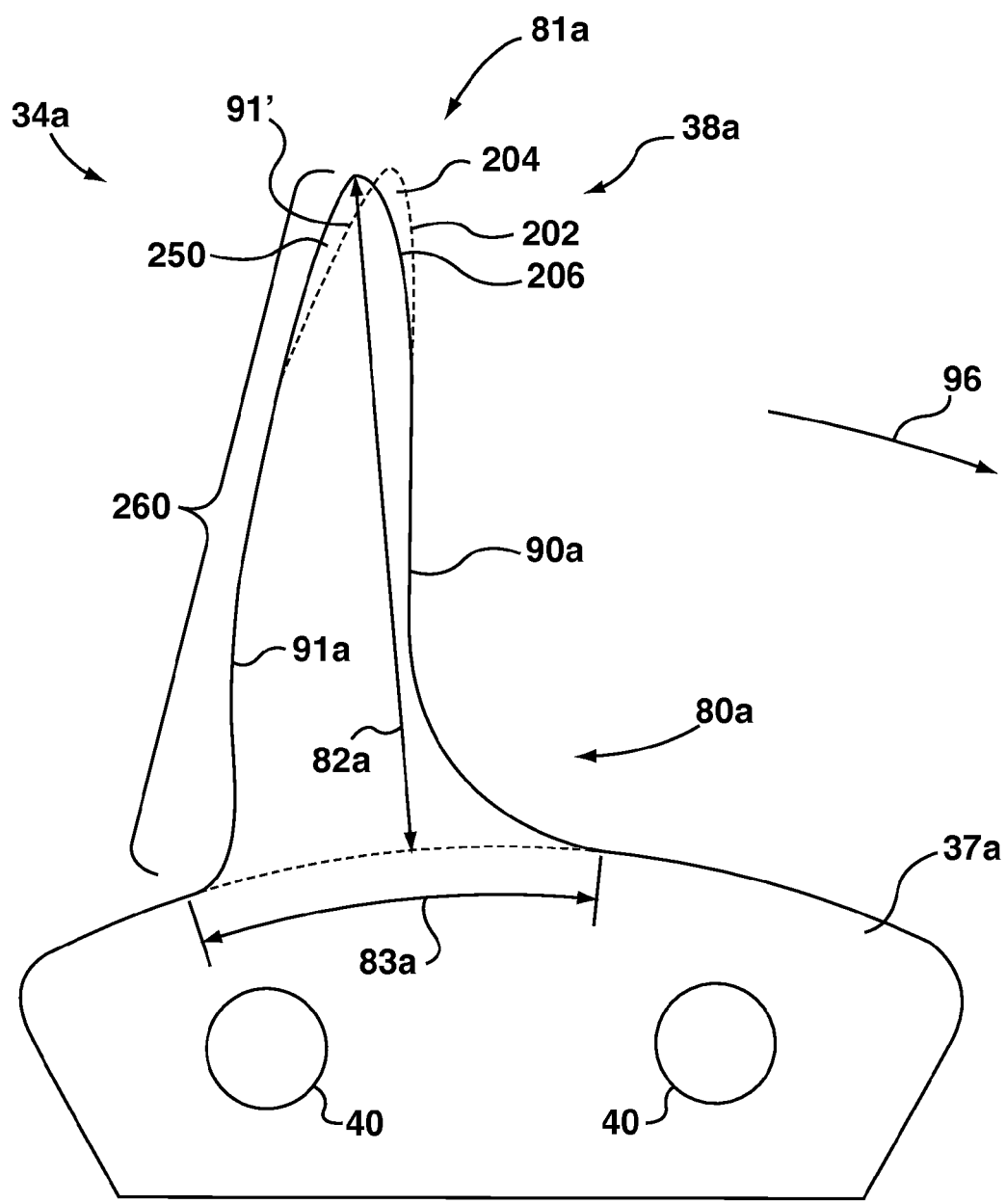
FIG. 6 is a side view of one example of a tine used with the machine of FIGS. 1 to 4.

Reference is therefore made to FIG. 6, which shows one example of a single tine 34*a* with a tooth 38*a* having a desirable tooth profile. The tooth 38*a* extends generally radially outward (when the tine 34*a* is mounted on a disc 32) from a root 80*a* to a tip 81*a*. The tooth 38*a* also includes a leading edge 90*a* and a trailing edge 91*a* that are on opposite sides of the tooth 38*a*, and extend from the tip 81*a* to the root 80*a*.

The tooth 38*a* has a tooth height 82*a* and a tooth width 83*a*. In the illustrated example, the tooth height 82*a* is the distance by which the tooth 38*a* extends away from the surface of the base portion 37*a* of the tine 34*a* in the radial direction. In this example, the base portion 37*a* has an arcuate surface, which, for reference, is extended through the root 80*a* of the tooth 38*a* as a phantom surface using dashed lines. As illustrated, the linear distance from the phantom surface to the tip 81*a*, in the radial direction (i.e. generally toward the shaft 30) is the tooth height 82*a*. The tooth width 83*a* is the arc length bounded by the leading and trailing edges 90*a*, 91*a*. In the illustrated example, the tooth height 82*a* is between 0.75 inches and 5 inches, and optionally can be between 1 inch and 3 inches. The tooth height 82*a* is also substantially larger than the tooth width 83*a*, and optionally can be between 1.25 and 3 times larger. Accordingly, holes formed using tooth 38*a* will be substantially deeper than they are wide (distance 55 measured in the machine direction).

As the machine 10 travels along the path of travel 14, and as the tooth 38*a* contacts the ground, the leading edge 90*a* will be the first tooth surface to contact and cut into the turf grass. The trailing edge 91*a* will be the final portion of the tooth 38*a* to leave the ground, as the tines rotate clockwise in the direction of arrow 96.

If the leading edge 90*a* has at its tip 81*a* a straight profile, such as that indicated by dashed line portion 202 in FIG. 6, then as the leading edge 90*a* leaves the ground, it will tend to "flip up" the soil above it, creating cosmetic and other damage to the turf grass. This problem may be corrected by removing small amounts of material from the leading edge at the tip of the tooth. The removed material is indicated at 204, the region between dashed line 202 and leading edge 90*a*, in FIG. 6, and the resultant new leading edge profile adjacent the tip 81*a* is shown as a convexly curved portion 206. In the new leading edge profile 206, the tooth tip 81*a* includes a convex curve rather than a straight line. The new curved profile at the tip 81*a* of the leading edge 206 is found to have much less tendency to "flip out" or damage the soil through which it is moving than a straight profile. The precise shape of the new leading edge profile can be varied depending on the type of soil encountered by the machine 10, but the shape will normally always be a convex curve.

Continuing to refer to FIG. 6, the trailing edge 91*a* may have a portion 250 added to it, for a different reason. The portion 250 is added to the trailing edge 91*a* of the tooth near the tip 81*a* of the tooth 38*a*, producing a new trailing edge profile 260 which is located "upstream" in the direction of rotation, when compared to a standard tooth trailing edge profile indicated, for comparison purposes only, using dashed line 91'. This has the effect of pushing the grass down at the periphery of the hole, thus helping to clear the hole to receive treatment liquid.

Figure 8:
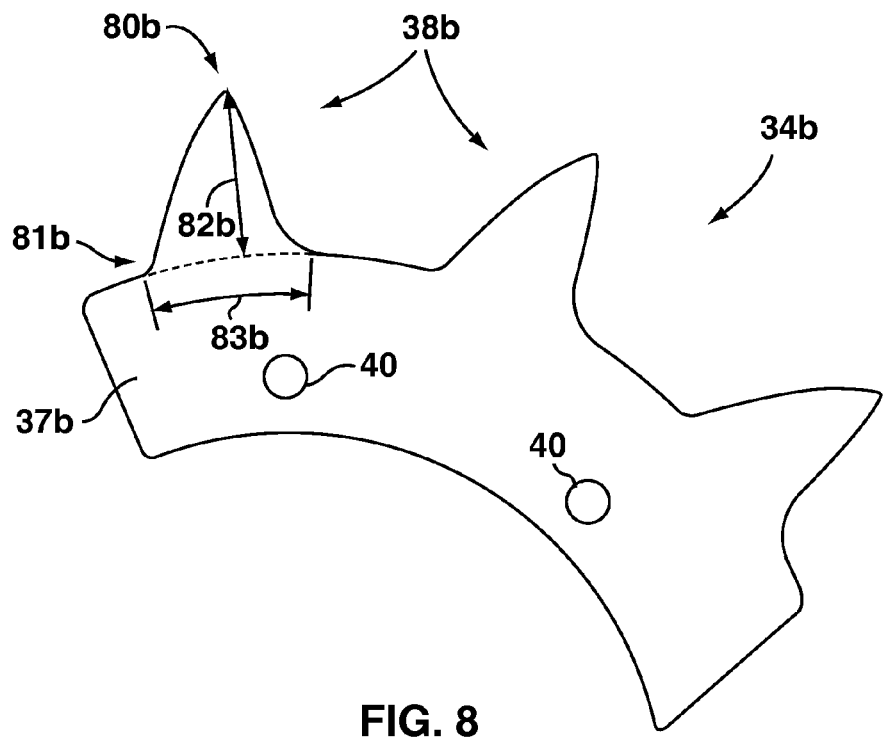
FIG. 8 is side view of another example of a tine used with the machine of FIGS. 1-4.
Figure 9:
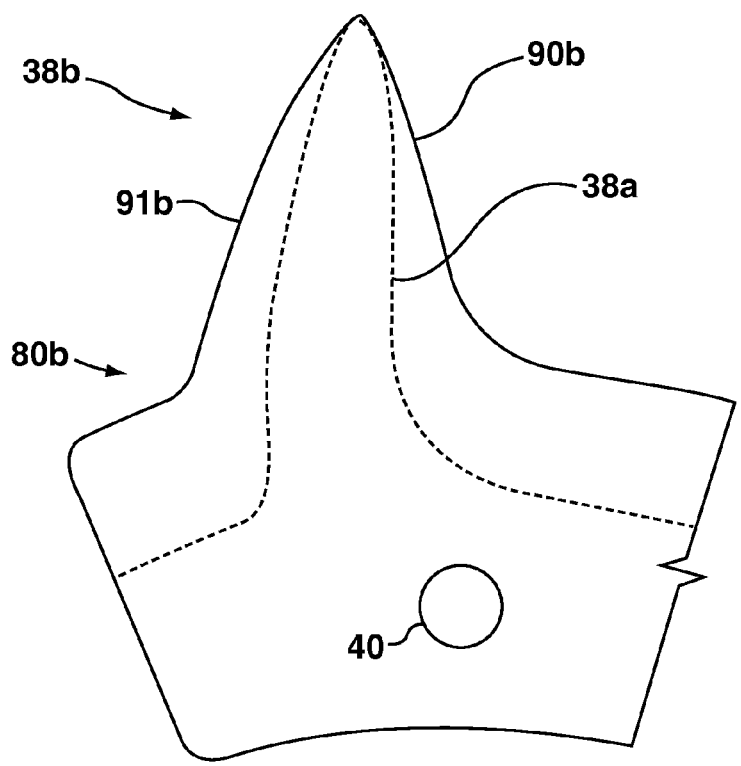
FIG. 9 is a side view comparison of the tine of FIG. 6 and the tine of FIG. 8.
Figure 10:
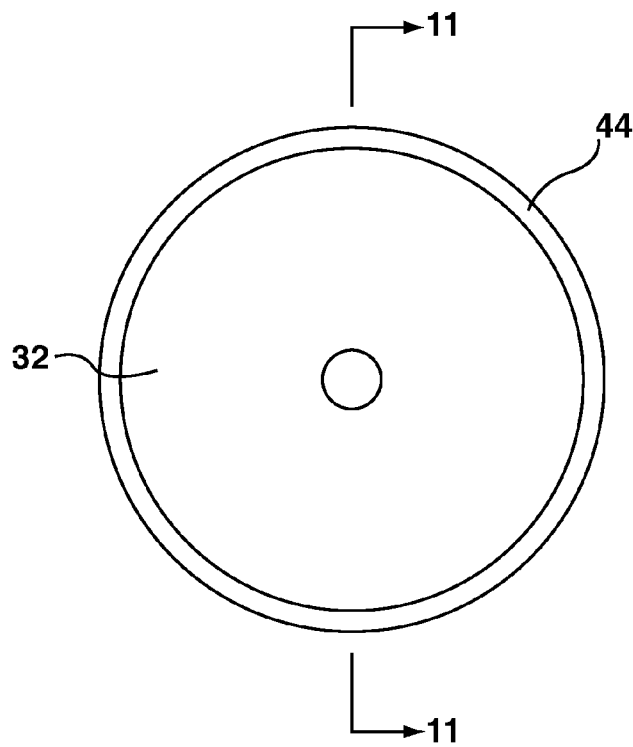
FIG. 10 is a side view of an example of a disc having a continuous blade cutter, for use on the machine of FIGS. 1-4.
Figure 11:
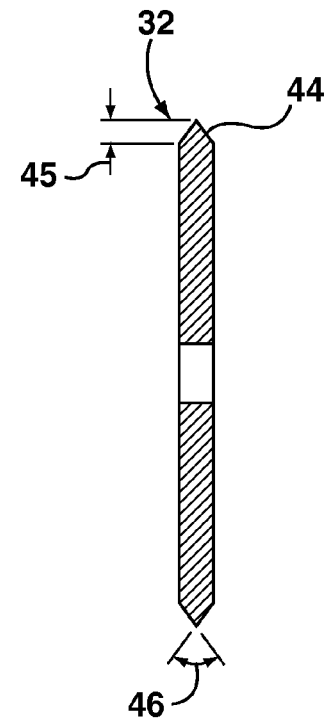
FIG. 11 is a section view taken along line 11-11 in FIG. 10.
Figure 12:
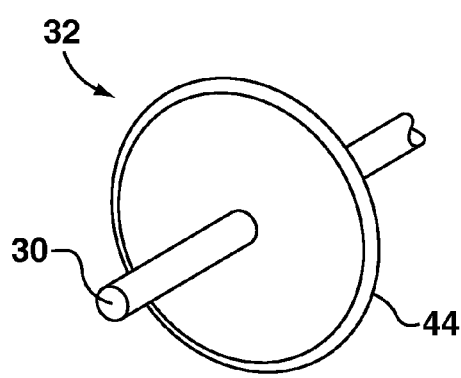
FIG. 12 is a perspective view of the disc of FIG. 9 mounted on a shaft.

Referring to FIGS. 8 and 9, another example of a tine 34*b* can include multiple teeth 38*b*. Tine 34*b* is similar to tine 34*a*, and like features will represented using like reference characters having a "b" suffix. It is also understood that features described in relation to tine 34*b* (such as tooth shape and the presence of multiple teeth on a single tine) can be applied to any other tine design, including tine 38*a*, and vice versa.

In contrast to teeth 38*a*, the teeth 38*b* on tine 34*b* have a shallow depth profile and are shaped so that the tooth width 83*b* is at least 60% of the tooth height 82*b*. Optionally, the tooth height 82*b* can be between 0.25-4 inches, and in some embodiments can be between 1 and 3 inches. The height 82*b* can be selected based on the properties of the turf being punctured.

For clarity, in FIG. 9 an example of tooth 38*a* is shown in dashed lines and overlaid on an example of a shallow profile tooth 38*b*. As illustrated, the shallow profile tooth 38*b* is wider than the tooth 38*a* at all points along the height of the tooth.

Using a shallow profile tooth 38*b* allows the machine 10 to form holes in the turf grass that are less deep, and typically wider (measured in the direction of travel) than holes formed by teeth 38*a*. Providing shallower, wider holes in the turf may expose a relatively larger surface area of the thatch layer and shallow root layer to the treatment liquid sprayed into the hole (compared to the hole formed using tooth 38a). Also, if a like number of teeth are used in both examples, the area between adjacent holes in the turf, for example area 84 in FIG. 5, may be decreased because each hole formed using a shallow profile tooth 38b is wider than the hole formed by tooth 38a.

Both the leading and trailing edges 90b, 91b of tooth 38b include a convexly curved portion adjacent the tip 81b. As explained above, such curvature may reduce aesthetic damage caused when the teeth 38b puncture the turf.

Referring to FIGS. 10-13, another example of a disc 32 is illustrated having another example of a cutter mechanism for cutting holes into the turf grass. In this example, the cutter mechanism is a generally continuous blade 44 that extends around the periphery of disc 32. The blade 44 has a generally wedge-shaped cross-section (FIG. 11) and can be integrally formed with the disc 32, as illustrated, or formed from a separate blade member that is connected to the disc 32 by fasteners, welding, or in any other suitable fashion.

Figure 13:
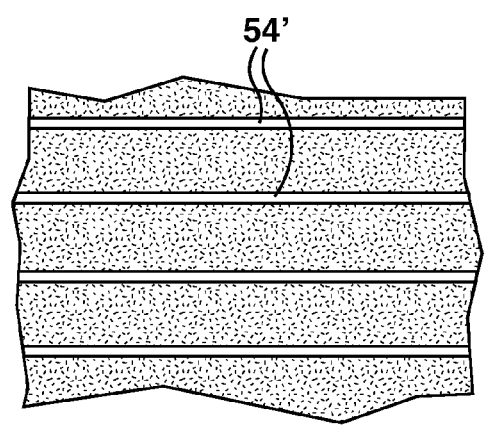
FIG. 13 is a top view showing the shape of a cut formed by the machine using the disc of FIG. 9.

When in contact with the ground, rotation of the disc 32 causes the blade 44 to cut a hole in the turf that has the form of an elongate furrow 54'. A plurality of such discs 32 mounted on the machine 10 will produce a plurality of parallel furrows 54' in the turf grass, as illustrated in FIG. 13. The height 45 and slope of the sides of the blade 44, measured by angle 46 between sides of the blade 44, can be adjusted to achieve a desired depth and width of the resulting furrows 54'.

In this configuration, treatment liquid can be continuously sprayed into the furrows 54' as the machine 10 advances across the turf to coat the entire length of each furrow 54'. Alternatively, the spray controller can control the nozzles behind each disc to spray discrete pulses of treatment liquid into the furrows 54', so that portions of the furrows 54' are treated while other portions remain untreated. Such an application may reduce the amount of treatment liquid used to effectively treat the furrow 54'.

Figure 14:
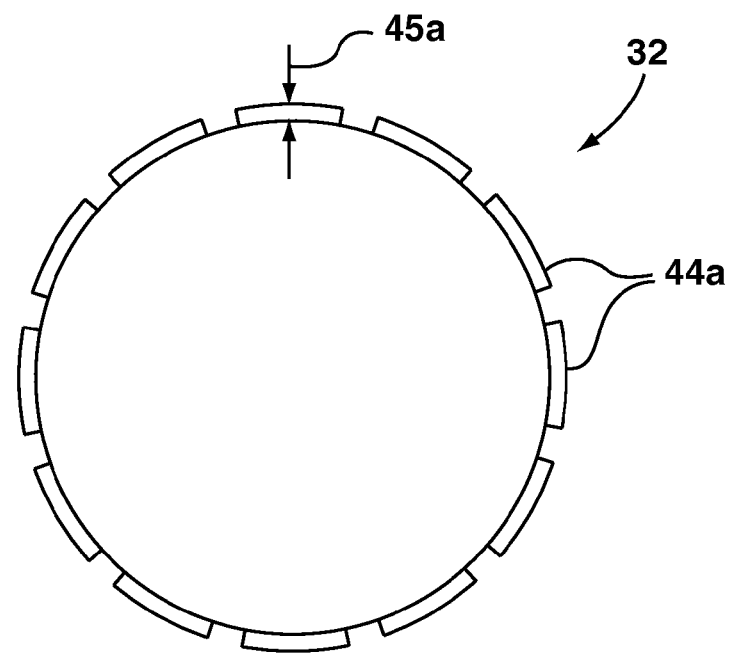
FIG. 14 is a side view of another example of a disc for use on the machine of FIGS. 1-4, having a plurality of blade segments.
Figure 15:
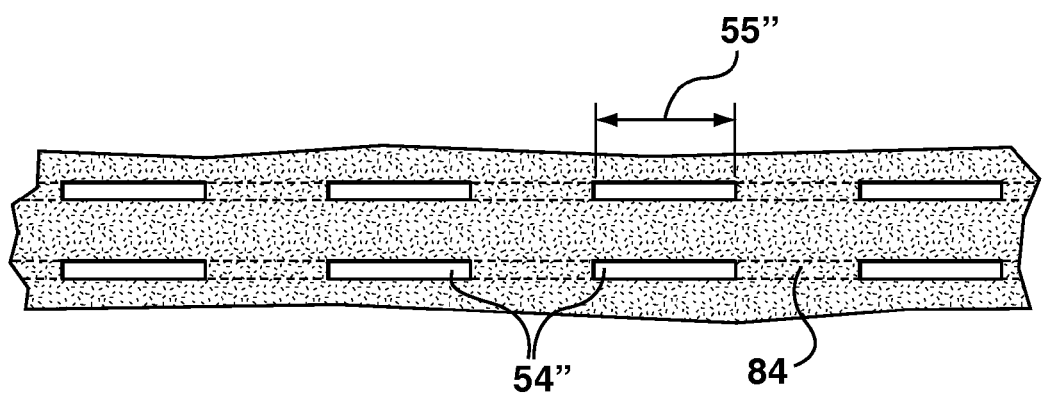
FIG. 15 is a top view showing a pattern of holes formed by the machine using the disc of FIG. 14.

Referring to FIGS. 14 and 15, another example of a cutter mechanism includes a plurality of blade segments 44a positioned around the periphery of a disc 32. Like blade 44, each of the blade segments 44a can be integral with the disc 32 or provided as separate attachments (for example as bolt on members like tines 34).

Each blade segment 44a has a blade height 45a and a blade slope or thickness (not shown) that can be selected to provide holes of a desired shape. Further, the number and relative spacing of the blade segments 44a can be varied to vary the resulting hole pattern formed.

Unlike the continuous furrow 54' formed by blade 44, the blade segments 44a will create a plurality of shorter, separate holes in the form of furrow segments 54". Each furrow segment 54" can have a length 55" in the machine direction that is between 0.5 and 6 inches. Between adjacent furrow segments 54" will be an undisturbed surface of the turf grass 84, as described above.

Other changes can also be made. For example, in some applications it may be preferred not to spray any treatment liquid on the turf grass surface, but rather to deposit the treatment liquid only in the holes 54. When the soil insects to be removed are present only below the ground, and not at surface level, this method avoids wasting the treatment liquid by spraying it on the surface, and also reduces the amount of toxic liquid to which the public is exposed, or which can be carried away by the wind.

Figure 7:
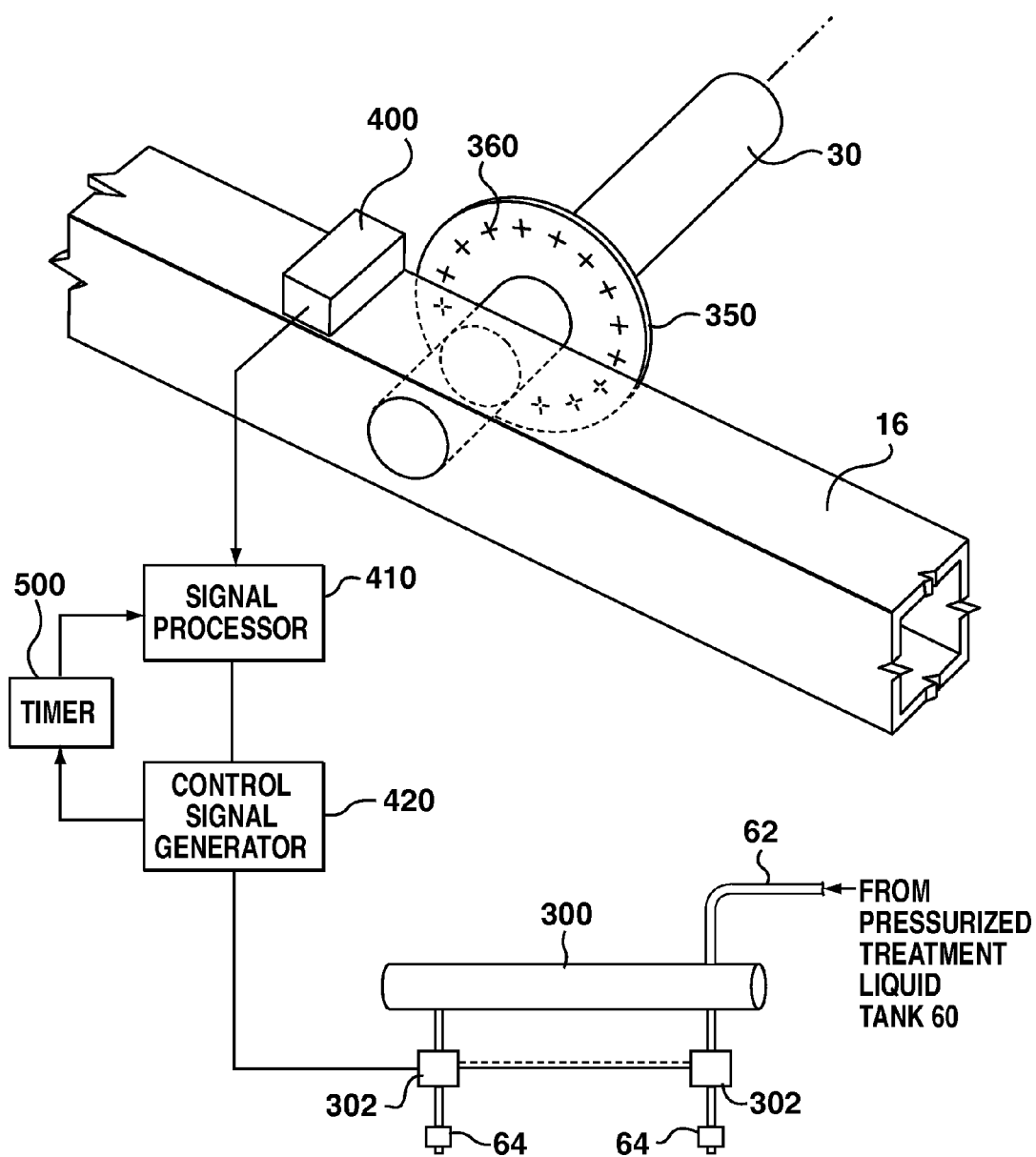
FIG. 7 is a schematic diagram of control equipment for controlling the sprayers in the FIG. 1 machine.

If it is desired to spray treatment liquid only into the holes 54, then the machine 10 can include a controller to control the operation of the spray nozzles 64 and/or can be modified in several different alternative ways to achieve the needed "pulsed" spraying. In a preferred embodiment, and as shown in FIG. 7, the sprayer may include a treatment liquid "rail" 300 similar to that used in fuel injection automobile engines. The treatment liquid rail 300 is connected to a hose 62 which supplies preferably pressurized treatment liquid to the rail from the tank 60.

A set of solenoid valves 302 is mounted on the rail 300. Preferably, one valve is provided for each spray nozzle 64. Each solenoid valve 302 may be activated by one or more control signals to open and then close its associated spray nozzle 64 at the times required for delivering a "pulse" or "packet" of treatment liquid to the turf grass holes over which the spray nozzles are then located.

The start time, duration and end time of delivering a treatment liquid packet into a hole in the turf grass can be controlled in various ways. In one way, a timing disc 350 is mounted on the shaft 30. The disc 350 displays all the timing marks 360 necessary to turn each solenoid valve on or off as needed. For this purpose, disc 350 rotates with the cutting discs 32 and is preferably fixed to shaft 30. The solenoid valve 302 for the spray nozzle of a given disc/tine set is turned on when the hole in question begins passing under the spray nozzle 64, and is turned off after the hole has passed the spray nozzle 64, using the timing marks 360. The timing marks 360 can each carry a different code and a single timing mark detector 400 can be used to scan the timing marks as they rotate in front of the detector 400. The detector 400 decodes the timing mark signals and sends the information therefrom to a signal processor 410. The signal processor 410 sends its signals to a control signal generator 420, which sends a control signal to the required valve 302, to turn it on or off.

Since the geometry of the machine is preferably fixed, the turn on and turn off times for each valve can be made coincident with the times when the appropriate hole 54 moves in or out from under the valve in question. However, if the cutting discs 32 were not connected (i.e. if they could rotate independently on shelf 30) when the machine is lifted above the ground, it may be necessary for each cutting disc to have its own timing mark physically associated with it only, and not with any cutting discs that can rotate independently.

Alternatively, or in addition to the use of timing marks 360, the controller can include a timer module 500 that can generate cause the controller to generate a pulse of treatment liquid at a predetermined time interval, including for example, one pulse every 3 seconds. The control signal generated by the signal generator 420 can be provided to the timer module 500 in order to re-start the count after each pulse. Once the predetermined time has been reached, the timer module 500 can alert the signal processor 410, which can activate the signal generator 420.

If the treatment liquid packets emitted from the nozzles are delivered only into the holes, then the amount of treatment liquid used will be reduced. This can produce large cost savings and less exposure of possibly toxic substances to the public.

Optionally, instead of, or in addition to, the timing disc 350 and detector 400 described above, the controller used to control the spraying of the treatment liquid can be any other suitable type of control mechanism, such as a timing belt or chain, an optical sensor configured to detect the presence of holes and trigger a liquid pulse, a timing based system (for example using timer module 500) that generates a spray pulse every few seconds, and/or a manually operated actuator that enables a machine operator to create liquid pulses on demand.

It will be understood by those skilled in the art that the machine 10 can include any of the cutter mechanisms described above, or any combination thereof (i.e. a disc 32 with tines 34 and a disc 32 with blade segments 44a can be provided on the same shaft 30, on the same machine 10). It will also be understood that either a continuous sprayer systems, pulsed sprayer systems or both can be used in combination with any cutting mechanism, including those described herein.

Optionally, the cutter mechanism can be a fixed blade that carves the continuous groove in the ground. In such examples, the cutter need not rotate and can be fixedly mounted to the frame. The fixed blade cutter can be provided as a separate member connected to the frame, or may still be provided on a disc mounted to the shaft, but the disc need not rotate when the machine is in use. Such a disc (for example the disc illustrated in FIGS. 10-12) can be non-rotatably connected to frame during use, but can be selectably rotatable during servicing or maintenance to move a fresh portion of the blade into contact with the ground. This may reduce the frequency at which the discs need to be replaced when the machine is in use.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. An apparatus for spraying a treatment liquid onto a grass growing on a ground surface, the apparatus adapted for movement forwardly along a path of travel and to cut holes in the ground surface, the apparatus comprising:
   a plurality of rotatable discs spaced laterally apart across the path of travel, each disc having a plurality of cutters thereon, the cutters being adapted to penetrate the ground surface and to cut the holes therein as the apparatus travels forwardly and the cutters contact the ground surface, the cutters being adapted to cut the holes such that the holes are spaced apart along the path of travel and also spaced apart laterally,
   a plurality of nozzles positioned on the apparatus above the grass such that each nozzle is spaced rearwardly along the path of travel from an associated one of the rotatable discs but is aligned along the path of travel with such disc, the nozzles being adapted to spray the treatment liquid, and
a controller for causing the nozzles to spray the treatment liquid into the holes.

2. The apparatus of claim 1, wherein the controller controls the nozzles to spray the treatment liquid continuously as the apparatus travels along the path of travel, thereby spraying the treatment liquid both into the holes and onto the surface of the grass between the holes.

3. The apparatus of claim 1, wherein the controller is configured to control the nozzles to spray pulses of the treatment liquid into the holes and not to spray the treatment liquid onto a surface of the grass between the holes.

4. The apparatus of claim 3 wherein the controller comprises a timing mark carrier having a turn on timing mark and a turn off timing mark, and a circuit for generating a turn on signal when each associated nozzle moves over one of the holes and for generating a turn off signal when each nozzle moves past the one of the holes, so that the treatment liquid will be sprayed only in the holes and not between the holes.

5. The apparatus of claim 4 wherein the plurality of discs are fixedly mounted to a rotatable shaft and the timing mark carrier comprises a timing disc also fixed to the shaft and rotatable with the shaft, the timing disc comprising timing marks for each nozzle, the controller comprising a reader for detecting the timing marks and their position, the controller being coupled to the circuit for producing the turn on and turn off signals as the timing marks move past the reader.

6. The apparatus of claim 1, wherein the plurality of cutters comprises a plurality of tines, wherein the tines rotate with the discs and cut the holes in the ground surface, each tine having a leading edge, the leading edge having a convex shape, wherein, as the tine enters the ground surface, changes in a load of soil against the leading edge are reduced, thereby limiting damage to the grass as the holes are cut.

7. The apparatus of claim 6, wherein each tine also has a trailing edge, the trailing edge being of convex configuration to push down the grass around the periphery of the holes, thereby reducing obstruction of the holes.

8. The apparatus of claim 1, wherein the plurality of cutters comprises a plurality of tines connected around the periphery of each disc, each tine comprising a tooth to form the hole.

9. The apparatus of claim 1, wherein each tooth comprises a leading edge and an opposing trailing edge extending between a root and an opposing tip, and the leading edge comprises a convexly curved portion adjacent the tip to inhibit damaging the grass when the tooth forms the hole.

10. The apparatus of claim 9, wherein the trailing edge comprises a generally convex portion forming at least 50% of the trailing edge to compress the grass around the periphery of the hole when the tooth exits the grass, thereby inhibiting the grass from entering the hole.

11. The apparatus of claim 10, wherein the leading edge further comprises a straight portion intermediate the convexly curved portion and the root.

12. The apparatus of claim 9, wherein each tooth has a tooth height and a tooth width that is at least 65% of the tooth height.

\* \* \* \* \*